(12) United States Patent
Rinkevich et al.

(10) Patent No.: US 7,694,336 B2
(45) Date of Patent: *Apr. 6, 2010

(54) AGGREGATED AUTHENTICATED IDENTITY APPARATUS FOR AND METHOD THEREFOR

(75) Inventors: Debora Rinkevich, Austin, TX (US); John Michael Garrison, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 11/950,007

(22) Filed: Dec. 4, 2007

(65) Prior Publication Data

US 2008/0104697 A1   May 1, 2008

Related U.S. Application Data

(63) Continuation of application No. 09/731,623, filed on Dec. 7, 2000, now Pat. No. 7,356,704.

(51) Int. Cl.
*H04L 9/32* (2006.01)
*H04L 9/00* (2006.01)
*G06F 7/04* (2006.01)

(52) U.S. Cl. .......... 726/21; 713/182; 713/183; 713/184; 713/185; 713/186; 726/27; 726/28; 726/29; 726/30

(58) Field of Classification Search ............ 726/23
See application file for complete search history.

(56) References Cited

U.S. PATENT DOCUMENTS

| 5,655,077 A | 8/1997 | Jones et al. |
| 5,740,361 A | 4/1998 | Brown |
| 5,774,551 A | 6/1998 | Wu et al. |
| 6,105,132 A | 8/2000 | Fritch et al. |

FOREIGN PATENT DOCUMENTS

WO    9850843 A1   11/1998

*Primary Examiner*—Longbit Chai
(74) *Attorney, Agent, or Firm*—Yee & Associates, P.C.; Jeffrey S. LaBaw

(57) ABSTRACT

An apparatus and method for authenticating users on a data processing system is implemented. The present invention provides for aggregating authenticated identities and related authorization information. A security context created in response to a first user logon is saved in response to a second logon. A composite or aggregate security context is created based on the identity passed in the second logon. Access may then be granted (or denied) based on the current, aggregated security context. Upon logout of the user based on the second identity, the aggregate security context is destroyed, and the security context reverts to the context previously saved.

16 Claims, 4 Drawing Sheets

AGGREGATED AUTHENTICATED IDENTITY APPARATUS FOR AND METHOD THEREFOR

This application is a continuation of application Ser. No. 09/731,623, filed Dec. 7, 2000, now U.S. Pat. No. 7,356,704 status allowed.

TECHNICAL FIELD

The present invention relates in general to data processing systems, and in particular, to user authentication and access in a data processing system.

BACKGROUND INFORMATION

Many applications and operating systems (especially in a multi-user environment) support security mechanisms which include some form of user authentication. Typically a user authenticates (that is, "logs on") to the application or operating system. The application or operating system then creates a security context. A security context is a representation of the user's identity as well as any authorization information associated therewith. For example, the context may include the user's identifier (user ID), the user's role, and group membership. Once logged on, the information associated with the security context is used by the application or operating system to determine whether the user has the proper authority to access requested resources or take selected actions.

By way of example, consider a user accessing a "secure" website, using a web browser. The website requests logon information from the user, typically consisting of a user ID and a password. The user supplies values for both, and the web server verifies that the combination provided by the user is valid, and creates a security context for the user. An illustrative security context 100 is schematically depicted in FIG. 1. In this example, security context 100 has a user ID field 102 with the value "identitya," a role field 104 containing the role of the user associated with identitya, here an Administrator denoted by the value "Admin," and two group fields 106A and 106B indicating that the user associated with identitya is a member of two groups, denoted by the values TeamA, and Staff. The browser user, now logged on, and associated with identitya, attempts to retrieve information from the web server. Based on the information in the security context, the web server determines whether the users request can be satisfied. If, for example the requested information can be accessed by any user in TeamA, then the request can be satisfied.

An application or operating system may support a sequence of logons, (which, particularly in directory server applications, may be referred to a binds) (without requiring the user to log off before logging on again. Additionally, an individual user may be associated with each identities (that is, user ID values) wherein a unique context is associated with each identity. Thus, for example, a system Administrator may have an identity which associates a security context in the role of System Administrator, and a second identity that associates a context with the user that includes roles as System Administrator and Printer Administrator. The access authorities available to the same user in the security context associated with the different identities need not be the same.

The application or operating system may employ one of several alternatives when creating and destroying security context. In a first alternative, when the user logs on, and a security context is created, any pre-existing security context is destroyed. When the user logs off the security contest is destroyed. This alternative is typically used when logging into web and LDAP servers. (An artisan of ordinary skill in the art would understand that LDAP refers to the Lightweight Directory Access Protocol, which is an open industry standard for accessing a directory, which is a particular database containing information describing attributes associated with users and resources on a network. The specifications for the LDAP Version 3 may be found in Request for Comments (RFC) 2251. (RFCs are known by artisans of ordinary skill in the data processing art to be publications by which Internet standards are promulgated.) An alternative model saves a pre-existing security context by, for example, pushing the context onto a stack, and a new security context created. The new security context is used to access resources. When the user logs off, the new security context is destroyed, and the pre-existing security context is restored, that is, popped off the stack. This model is supported by, for example, the Distributed Computing Environment (DCE). (An artisan of ordinary skill in the art would recognize the DCE as a standardized architecture for distributing applications transparently across networks of computers. DCE is promulgated by the Open Software Foundation (OSF).) In both of these models, the user's access is determined by the current security context. Thus, if the user needs access that requires authority not associated with the current context, the user must log onto the system with the user's identity that corresponds to a security context that is associated with the required level of access authority. As a consequence, the security policies may typically be established in a simple hierarchical structure, whereby each level of authorization includes all of the access rights granted by the authorization levels lower in the hierarchy. This may be understood by referring to FIG. 1B illustrating a hierarchical structure of access authority in Venn diagram form. In the exemplary hierarchical structure in FIG. 1B, four levels of authority are depicted. Level 108 may be associated with general user access authority. Level 110 may be associated with Printer Administrator access authority, which access authority includes all of the general user authority and additionally, authority necessary to perform the tasks associated with maintaining and configuring networked printer resources. Level 112 may correspond to the authorization level for a Network Administrator, In the hierarchical structure of FIG. 1B, these authorities would include the authorities granted general users as well as those granted the Printer Administrator and additionally the authorities required to perform the tasks associated with the management of the network generally. Level 114 may be associated with a System Administrator, which authorities include those of the general user, the Printer and Network Administrators, and additionally the authorities necessary to perform the tasks associated with management of the overall system. Consequently, in such a structure, when say for example, the Network Administrator logs on to perform a general user operation, perhaps access to a distributed application, for example, a spreadsheet application, the Network Administrator is logged on with additional authorities not necessary to perform the current task. Such logons with authorities that are not necessary present opportunities for security breaches. Thus the hierarchical structure, of which FIG. 1B is exemplary, is not a particularly satisfactory alternative to the problem of multiple logons and logouts. Consequently, there is a need in the art for mechanisms to permit finer granularity in access authorization structures without exacerbating the complications associated with multiple user logins.

SUMMARY OF THE INVENTION

The aforementioned needs are addressed by the present invention. Accordingly there is provided, in a first form, an authentication method. The method includes generating a first security context in response to a first user authentication. A second security context is generated in response to a second user authentication. The second security context aggregates the first security context and a security context corresponding to an identity in the second user authentication.

There is also provided, in a second form, a computer program product embodied in a tangible storage medium, the program product comprising a program of instructions for performing the method steps for an authentication method. Included are instructions for generating a first security context in response to a first user authentication. The instructions also perform the step of generating a second security context in response to a second user authentication, in which the second security context aggregates the first security context and a security context corresponding to an identity in the second user authentication.

Additionally, there is provided, in a third form, a data processing system including circuitry operable for generating a first security context in response to a first user authentication and circuitry operable for generating a second security context in response to a second user authentication. The second security context aggregates the first security context and a security context corresponding to an identity in the second user authentication.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
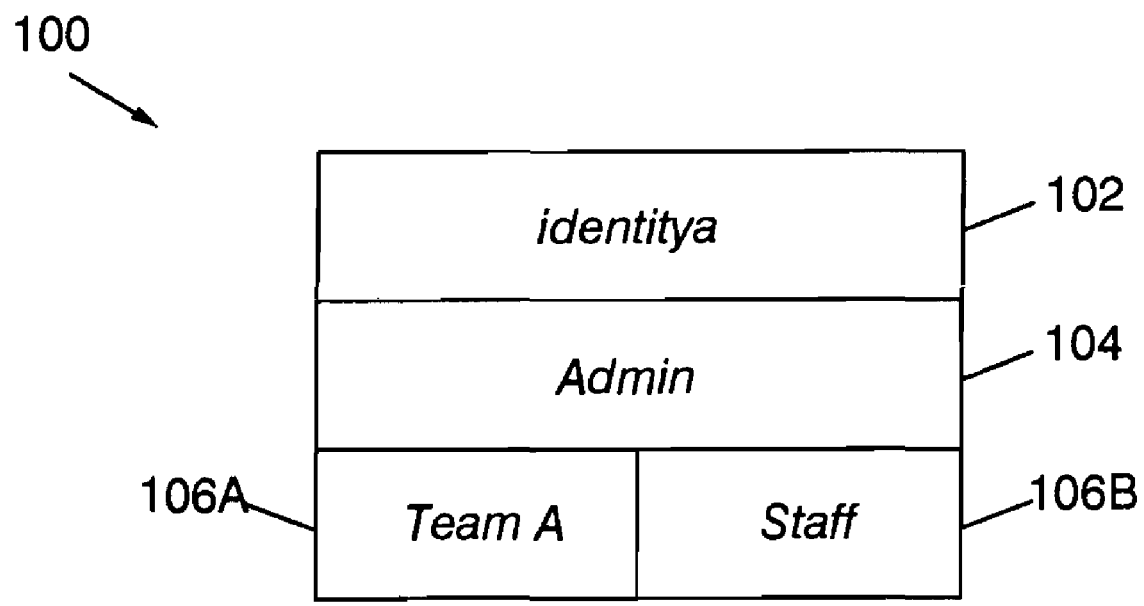
FIG. 1A schematically illustrates a security context which may be used in an embodiment of the present invention.

The present invention provides a system and method for aggregating authenticated identities. A security context created in response to a first user logon is saved in response to a second logon. A composite or aggregate security context is created based on the identity passed in the second logon. Access may then be granted (or denied) based on the current, aggregated security context. Upon logout of the user based on the second identity, the aggregate security context is destroyed, and the security context reverts to the context previously saved. Alternatively, in another embodiment, all security contexts, including those on the stack, may be destroyed.

In the following description, numerous specific details are set forth such as specific field values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
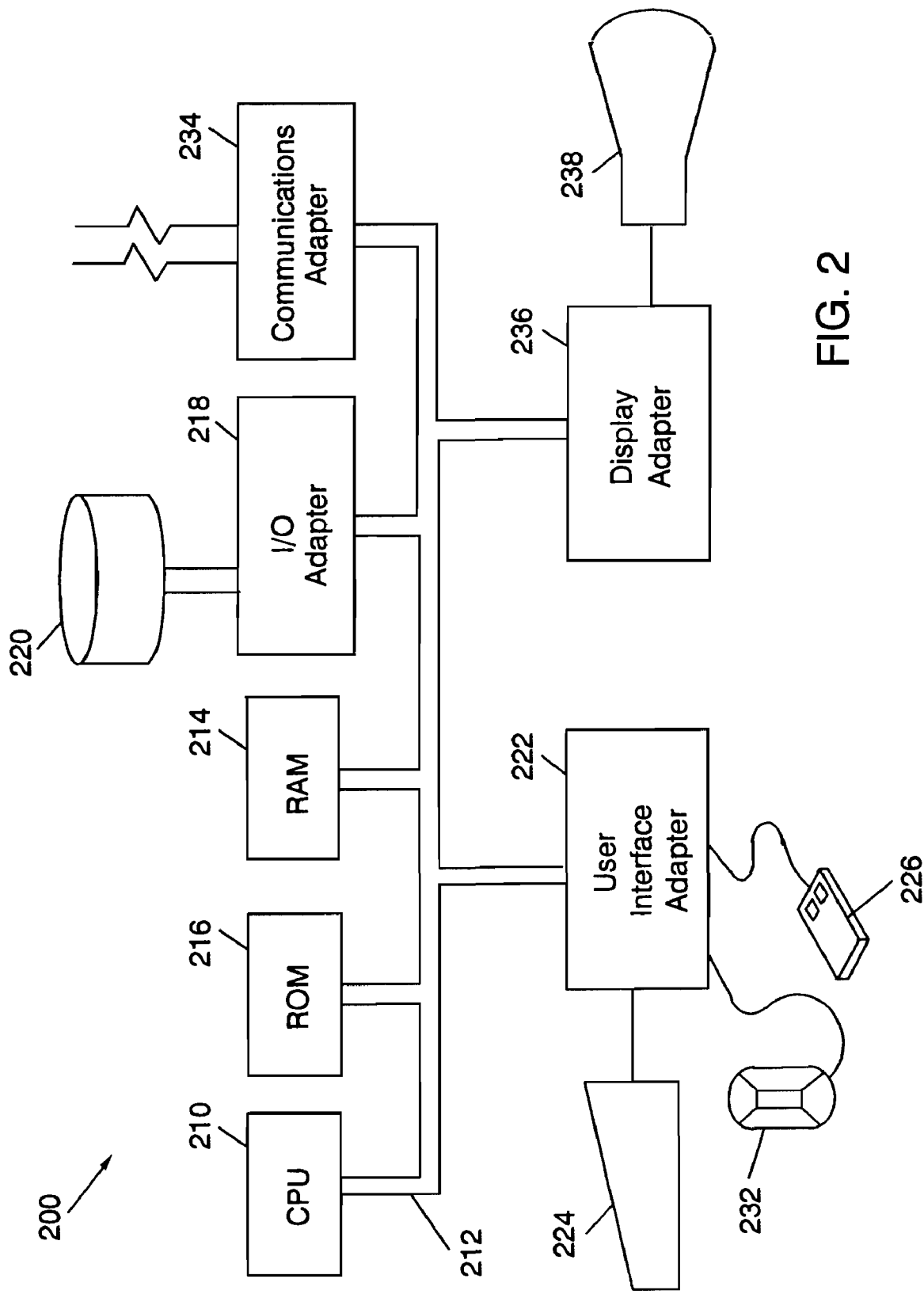
FIG. 2 illustrates, in block diagram form, a data processing system implemented in accordance with an embodiment of the present invention.

Referring first to FIG. 2, an example is shown of a data processing system 200 which may be used for the invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Input/Output devices are also connected to system bus 212 via user interface adapter 222 and display adapter 236. Keyboard 224, track ball 232, mouse 226 and speakers 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3:
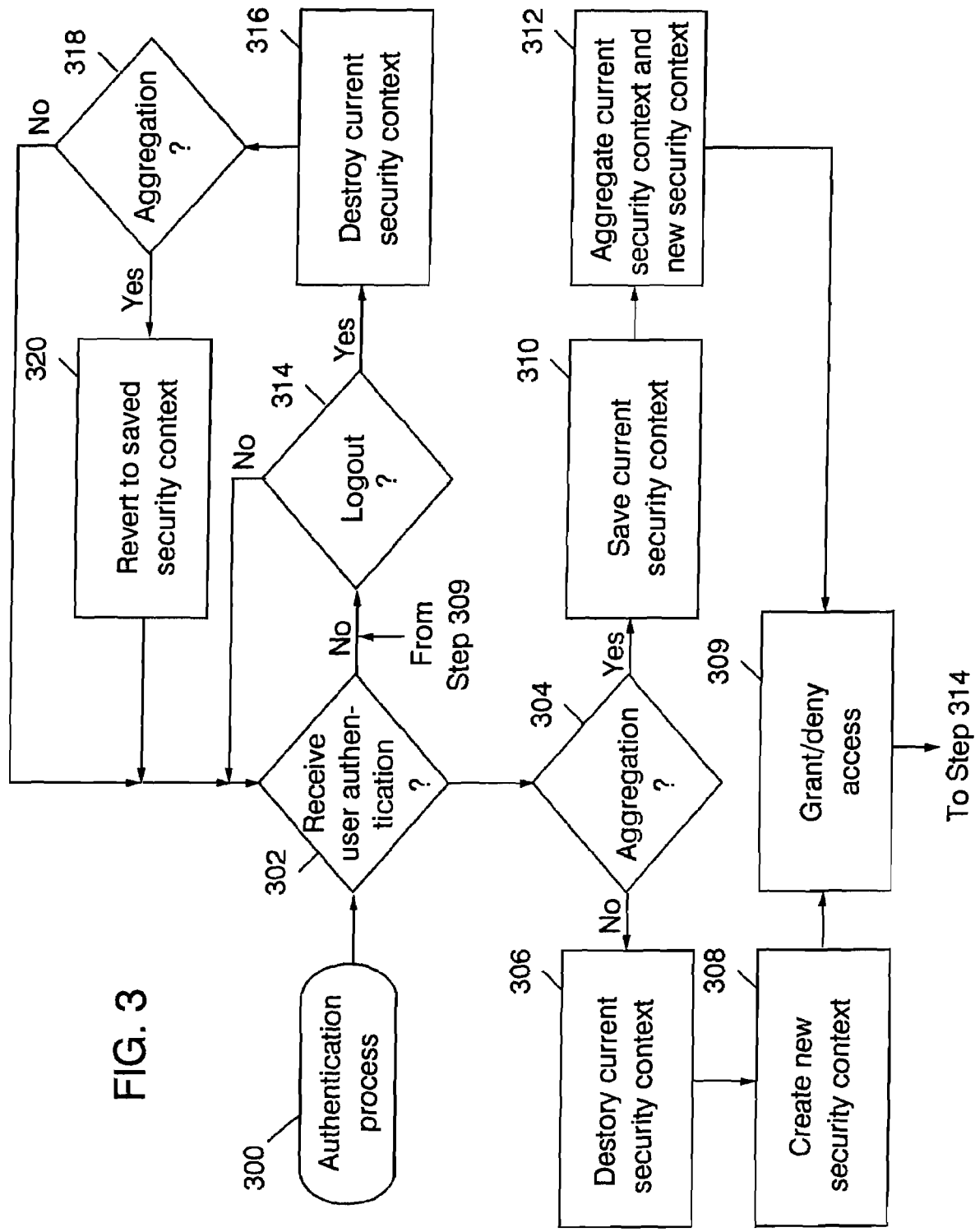
FIG. 3 illustrates, in flow chart form, a methodology in accordance with an embodiment of the present invention.

Refer now to FIG. 3, illustrating, in flow chart form, authentication methodology 300 in accordance with the principles of the present invention. In step 302 it is determined if a user authentication has been received, that is if a user has requested a logon by submitting a user ID value and password value. (The submission of a user ID value and password may simply be referred to as submitting a user ID and password hereinbelow, however, the values will be referred to explicitly where the context requires.)

If a user authentication has been received, in step 304 it is determined if security context aggregation is enabled. Aggregation may be enabled for a application/operating system in response to a predetermined set of policies. For example, if the policies permit the user to select the type of authentication, in an embodiment of system 200, FIG. 2, in which the operating system employs a graphical user interface (GUI), a dialog box may be presented displaying the fields for receiving the corresponding values: User ID, Password, and Aggregate identities? (Yes/No). Alternatively in an embodiment of system 100 using a command line interface (CLI), a command line "switch" may be used. Such a logon might have the exemplary form: "logon user=fred pw≈foo -a" to log on with the identity "fred", with the password "foo" and the switch "-a" indicating that the logon should be aggregated. If, however, aggregation is not enabled, in step 306 a current security context, if a current security context exists, is destroyed, and in step 308 a new security context created. Based on the security context created in step 306, access is granted or denied, step 309.

Returning to step 304, if aggregation is enabled step 304 proceeds by the "Yes" branch. In step 310 the current security context is saved. For example, the current security context may be saved by pushing the current context onto a stack. In step 312, the current security context is aggregated with a new security context based on the identity received as the value of the user ID in step 302, and the aggregate current security context becomes the new security context. In step 309 access is granted or denied in response to the new current security context from step 312. Process 300, then proceeds loops over steps 302 and 314-16 logouts and authentications as discussed further below.

Figure 1B:
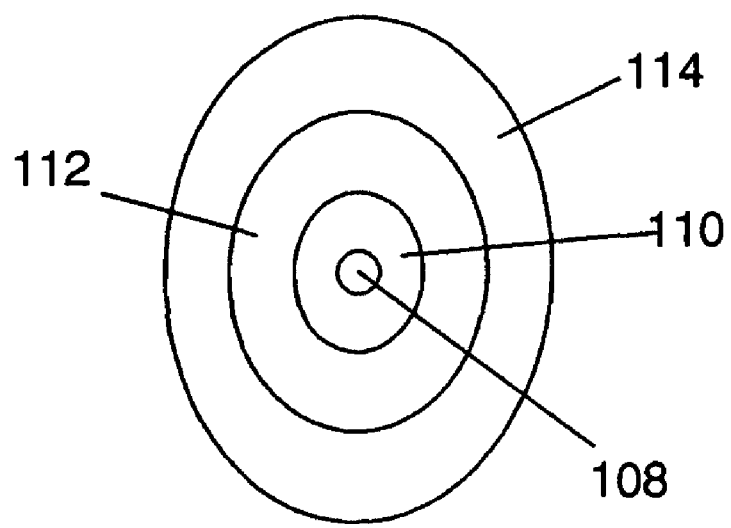
FIG. 1B illustrates in Venn diagram form, a hierarchical access authorization structure.
Figure 4A:
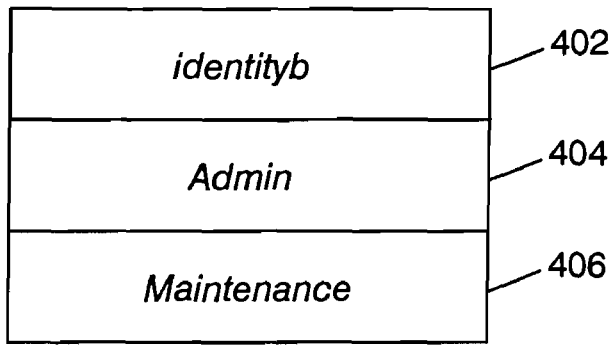
FIG. 4 schematically illustrates additional security context to which may be used in an embodiment of the present invention.
Figure 4B:
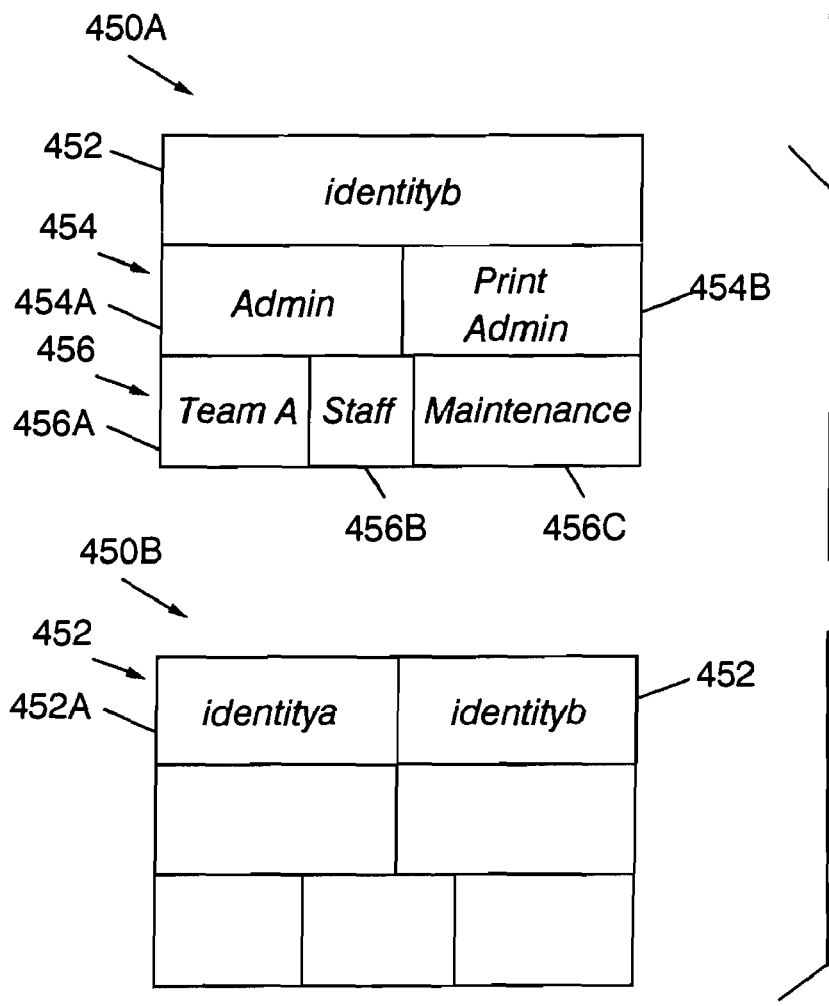

This may be further understood by referring to FIG. 4, illustrating in schematic form, a security context 400. Assuming that, by way of example, the user has authenticated, in step 302, FIG. 3, with a userID of "indentityb," and the security context associated therewith is security context 400. Field 402 contains the userID of identityb, the role corresponding therewith, field 404 is Printer Administrator ("PrintAdmin"), and the group, field 406, is "Maintenance." Suppose, further, that the current security context corresponds to security context 100, FIG. 1. Then, in step 310, security context 100 is saved. Additionally, in step 312, the new security context becomes the aggregate of security context 100, FIG. 1 and security context 400, FIG. 4. FIG. 4 also schematically illustrates security context 450A, which may be the new security context. Field 452 contains the userID of identityb. The roles associated with security context 450A is field 454 with subfields 454A and 454B, respectively, Admin and PrintAdmin. similarly, security context 450 includes field 456 containing the groups TeamA, subfield 456A, Staff, subfield 456B and Maintenance, subfield 456C. Alternatively, in an embodiment in which the Access Control Model of the application or operating system supports the use of individual userIDs on Access Control Lists, the user's identities may also be aggregated. (An Access Control List includes a list of entities that are to be protected, for example, file directories, etc., and an associated list of permissions.) A security context 450B corresponding to such an embodiment is also schematically illustrated in FIG. 4. Field 452 of security context 450B has a subfields 452A and 452B containing identitya and identityb, respectively. (It would be understood by artisans of ordinary skill that security context 100, FIG. 1 and security contexts 400 and 450, FIG. 4, are for illustrative purposes only, and the principles of the present invention are applicable to security contexts having other, structural implementations and values contained in the fields therein.)

Returning to step 302, if a user authentication is not received, step 302 proceeds by the "No" branch to step 314. In step 314, it is determined if the user logs out. If not, methodology 300 loops between steps 314 and 302 to receive user authentication requests, or logout requests.

Returning to step 314, if a logout is received, step 314 proceeds by the "Yes" branch, and in step 316 the current security context is destroyed. (An artisan of ordinary skill would understand that a security context may be "destroyed" by releasing, or freeing, the data structures maintaining the state of the security context, that is, freeing the portion of memory, such as RAM 214, FIG. 2, containing the data structures.) In step 318, if aggregation has not been enabled, as discussed in conjunction with step 304, process 300 returns to step 302. Otherwise, step 318 proceeds via the "Yes" branch to step 320, and the security context saved in step 310 is reverted to. Process 300 then returns to step 302.

This may be understood by considering further the example discussed in conjunction with steps 310 and 312, FIG. 3. Upon logoff of the user in the context of identityb, via step 314, the current context, security context 450, FIG. 4 is destroyed, via step 316, FIG. 3, and the previous context, saved via step 310, FIG. 3, is reverted to, by for example, popping the context off of a stack, via step 320 and the "Yes" branch of step 318.

Figure 5:
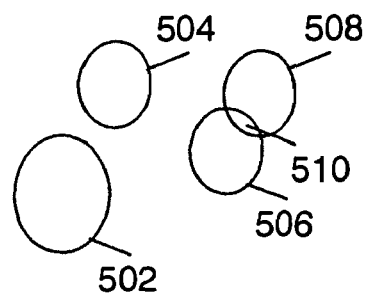
FIG. 5 illustrates in Venn diagram form, a partioning of access authority which may be used in an embodiment of the present invention.

In this way an authentication mechanism is implemented which permits a user to selectively authenticate without necessarily giving up already established access. (Note that a user need not refer to a "human" user but may, for example, include a proxy server running under a user's identity.) Consequently, access authorizations may be have fine granularity, both vertically, that is, along organizational lines, and horizontally, that is, along functional lines, to reduce the opportunity for comprise of system security without increasing the inconvenience of multiple logon/logoff sequences. Moreover, the partitioning of access authority need not be hierarchical, such as that illustrated in Venn diagram form in FIG. 1B. Thus, for example, a Printer Administrator may have authorities not granted a System Administrator, wherein, the authorities may be disjoint, as illustrated in Venn diagram form in FIG. 5, in which the set 502 (which may represent the set of System Administrator access authorities) does not include access authorities in set 504 (which may represent the set of System Administrator access authorities). Additionally, authorities may be partially disjoint, such a sets of authorities 506 and 508, FIG. 5. By way or example, a System Administrator may be granted access to private personnel records, only for the purpose of backing up lost records due to a system failure, (which may, for example, be associated with a security context with a role of Admin and group of Maintenance) while a Human Resources Administrator may have access to not only back up records, but have access for reading and writing, generally. In the Venn diagram of FIG. 5, the common authority to back up lost records, would be associated with the intersection 510 of sets 506 and 508.

Although the present invention and its advantages have been described in detail, it should be understood that various changes, substitutions and alterations can be made herein without departing from the spirit and scope of the invention as defined by the appended claims.

What is claimed is:

1. A computer program product embodied in a tangible storage medium, the program product comprising a program of instructions for performing the method steps of:
    generating a first security context in response to a first user authentication;
    generating a second security context in response to a second user authentication, wherein said second security context is an aggregate of said first security context and a security context corresponding to an identity in said second user authentication.

2. The program product of claim 1 further comprising instructions for performing the step of saving said first security context.

3. The program product of claim 2 wherein said step of saving said first security context comprises the step of pushing said first security context on a stack.

4. The program product of claim 2 further comprising instructions for performing the step of reverting to said first security context in response to a user logoff, wherein said first security context is then used to access security protected resources by a user who issued the user logoff.

5. The program product of claim 4 wherein said step of reverting to said first security context comprises the step of popping said first security context off of a stack.

6. The program product of claim 1 further comprising instructions for performing the step of receiving a user logoff.

7. The program product of claim 6 further comprising instructions for performing the step of destroying said second security context in response to said step of receiving said user logoff.

8. The program product of claim 1 further comprising instructions for performing the step of determining an access permission in response to said second security context.

9. A data processing system comprising:
    circuitry operable for generating a first security context in response to a first user authentication;
    circuitry operable for generating a second security context in response to a second user authentication, wherein said second security context is an aggregate of said first security context and a security context corresponding to an identity in said second user authentication.

10. The system of claim 9 further comprising circuitry operable for saving said first security context.

11. The system of claim 10 wherein said circuitry operable for saving said first security context comprises the step of pushing said first security context on a stack.

12. The system of claim 10 further comprising circuitry operable for reverting to said first security context in response to a user logoff, wherein said first security context is then used to access security protected resources by a user who issued the user logoff.

13. The system of claim 12 wherein said circuitry operable for reverting to said first security context comprises circuitry operable for popping said first security context off of a stack.

14. The system of claim 9 further comprising circuitry operable for receiving a user logoff.

15. The system of claim 14 further comprising circuitry operable for destroying said second security context in response to said step of receiving said user logoff.

16. The system of claim 9 further comprising circuitry operable for determining an access permission in response to said second security context.

* * * * *